(12) United States Patent
Purohit et al.

(10) Patent No.: US 10,743,151 B2
(45) Date of Patent: Aug. 11, 2020

(54) ENHANCED MODES OF COMMUNICATION

(71) Applicant: International Business Machines Corporation, Armonk, NY (US)

(72) Inventors: Hina Purohit, Pimple Saudagar (IN); Prasad P. Purandare, Dhankawdi (IN); Girish Padmanabhan, Pune (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/140,641

(22) Filed: Sep. 25, 2018

(65) Prior Publication Data

US 2020/0100074 A1     Mar. 26, 2020

(51) Int. Cl.
*H04W 4/21* (2018.01)
*H04L 29/06* (2006.01)
*H04W 4/02* (2018.01)
*G06F 16/903* (2019.01)

(52) U.S. Cl.
CPC ............ *H04W 4/21* (2018.02); *G06F 16/903* (2019.01); *H04L 63/0492* (2013.01); *H04W 4/023* (2013.01)

(58) Field of Classification Search
CPC ....... H04W 4/21; H04W 4/023; G06F 16/903; H04L 63/0492
See application file for complete search history.

(56) References Cited

U.S. PATENT DOCUMENTS

| | | | | |
|---|---|---|---|---|
| 9,165,327 | B1 * | 10/2015 | Hyndman | G06Q 50/01 |
| 10,091,317 | B2 * | 10/2018 | Rifkin | H04L 67/26 |
| 2005/0164634 | A1 * | 7/2005 | Tanaka | H04L 63/0492 |
| | | | | 455/41.2 |
| 2007/0129959 | A1 * | 6/2007 | Bransky | G06Q 10/109 |
| | | | | 455/73 |
| 2009/0250513 | A1 * | 10/2009 | Shoemaker | G06Q 20/204 |
| | | | | 235/380 |
| 2009/0265794 | A1 * | 10/2009 | Apelqvist | G06Q 10/10 |
| | | | | 726/30 |

(Continued)

OTHER PUBLICATIONS

Sarah Perez, "This App Lets You Chat with Nearby Users . . . and Call Them on the Phone", WNM Live; Mar. 23, 2012, 2 pages.

*Primary Examiner* — Mehmood B. Khan
(74) *Attorney, Agent, or Firm* — Cantor Colburn LLP; Richard Wilhelm

(57) ABSTRACT

Aspects of the invention include collecting contact information in a background mode by a contact service application executing on a first electronic communication device of a first user. The collecting includes detecting via a first communication channel second electronic communication devices of second users executing copies of the contact service application. Contact information is received for each of the second users. At least a portion of the contact information for each of the second users is in a format that is not readable via a user interface of the first electronic communication device. A request from the first user to contact a selected one of the second users is received via the user interface of the first electronic communication device. In response to receiving the request, a second communication channel is initiated with the selected one of the second users based at least in part on the received contact information.

15 Claims, 5 Drawing Sheets

(56) References Cited

U.S. PATENT DOCUMENTS

| | | | |
|---|---|---|---|
| 2010/0280904 A1* | 11/2010 | Ahuja | G06Q 30/02 |
| | | | 705/14.58 |
| 2011/0194682 A1* | 8/2011 | Hans | H04M 1/2746 |
| | | | 379/201.04 |
| 2013/0217416 A1* | 8/2013 | Matthews, III | H04W 4/025 |
| | | | 455/456.2 |
| 2013/0259229 A1* | 10/2013 | Thumparthy | H04W 12/02 |
| | | | 380/247 |
| 2013/0298037 A1* | 11/2013 | Matthews, III | H04L 63/08 |
| | | | 715/753 |
| 2014/0075430 A1* | 3/2014 | Zheng | G06F 8/62 |
| | | | 717/174 |
| 2014/0208384 A1* | 7/2014 | Youssefian | H04L 63/0884 |
| | | | 726/3 |
| 2015/0099550 A1* | 4/2015 | Alharayeri | H04W 4/21 |
| | | | 455/456.3 |
| 2015/0134603 A1* | 5/2015 | Melamed | G06F 11/1453 |
| | | | 707/609 |
| 2015/0172241 A1 | 6/2015 | Sharma et al. | |
| 2016/0006791 A1* | 1/2016 | Ladiwala | H04W 4/023 |
| | | | 709/219 |
| 2016/0192121 A1* | 6/2016 | Jain | H04W 76/14 |
| | | | 455/41.2 |
| 2016/0198287 A1* | 7/2016 | Hulusi | H04M 1/0291 |
| | | | 455/41.1 |
| 2017/0013076 A1* | 1/2017 | Rifkin | H04L 67/26 |
| 2017/0134455 A1 | 5/2017 | Ballands et al. | |
| 2017/0188207 A1* | 6/2017 | Chien | H04W 76/10 |
| 2018/0070208 A1* | 3/2018 | Alharayeri | G06Q 50/01 |
| 2018/0152824 A1* | 5/2018 | Baker | H04W 4/21 |
| 2018/0302745 A1* | 10/2018 | Rifkin | H04W 4/021 |

\* cited by examiner

ENHANCED MODES OF COMMUNICATION

BACKGROUND

Embodiments of the present invention relate in general to electronic communication, and more specifically to using a contact service application to provide enhanced modes of communication.

People often interact in business settings with other people that they are not otherwise connected to via computer based social networks such as LinkedIn® or Facebook®. Once a business meeting is over it can be time consuming for a person to figure out how to contact a person that they just met. This can also apply to a non-business setting where a person may meet a college friend or other acquaintance and not remember to ask for their contact information. Locating contact information about a person can involve looking up a phone number or address, looking up an email address, and/or reaching out to a mutual acquaintance for contact information. At times the person will get the details about how to contact another person and at other times they will simply wait to ask the next time that they see the other person.

SUMMARY

Embodiments of the present invention include methods, systems, and computer program products for enhanced modes of communication. A non-limiting example method includes collecting contact information in a background mode by a contact service application executing on a first electronic communication device of a first user. The collecting includes detecting, via a first communication channel, one or more second electronic communication devices of second users in close proximity to the first electronic communication device and executing copies of the contact service application. Contact information is received for each of the second users via the second communication channel. At least a portion of the contact information for each of the second users is in a format that is not readable via a user interface of the first electronic communication device. A request from the first user to contact a selected one of the second users is received via the user interface of the first electronic communication device subsequent to the collecting when the first electronic device is no longer in close proximity to a second electronic communication device of the selected one of the second users. In response to receiving the request, a second communication channel is initiated with the selected one of the second users based at least in part on the received contact information. The second communication channel is different than the first communication channel.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
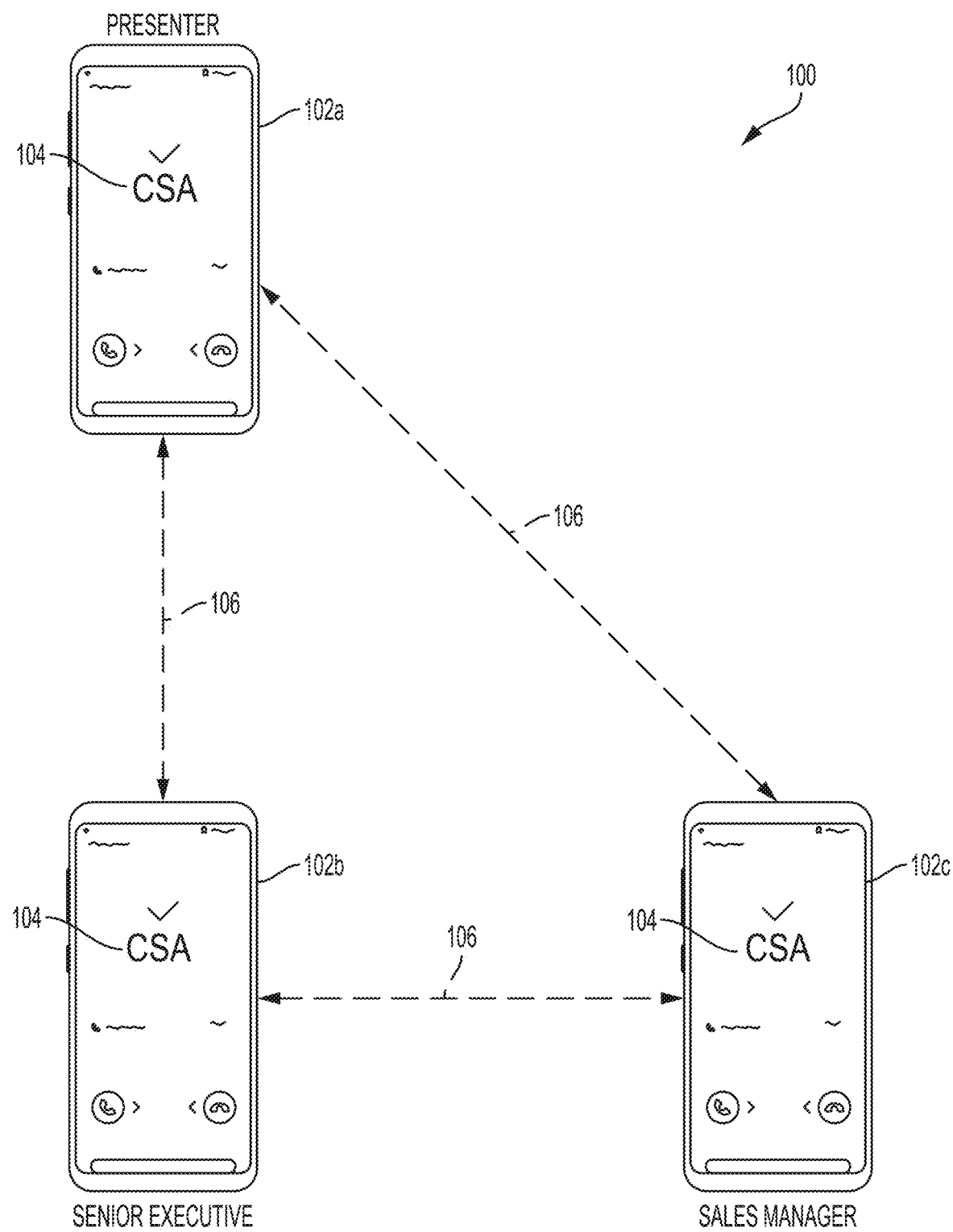
FIG. 1 depicts a system that provides enhanced modes of communication in accordance with one or more embodiments of the present invention.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two or three digit reference numbers. With minor exceptions, the leftmost digit(s) of each reference number correspond to the figure in which its element is first illustrated.

DETAILED DESCRIPTION

One or more embodiments of the present invention provides an enhanced mode of communication that allows a person to connect with people that he or she has last spoken to without requiring the person to be connected to them through any static collaboration medium such as LinkedIn® or Facebook®. One or more embodiments of the present invention capitalize on a generated association between objects (e.g., smart phones) built using Internet of Things (IoT) methods to develop a communication channel which can be operated based on cognitive emotional intelligence without any collaborative medium. Methods are provided to assist entities, or people, in contacting each other without requiring the entities to know contact details about each other. In addition, one or more embodiments of the present invention derive business intelligence to generate a workflow to connect entities through a common associated channel without the contact initiating entity having the contact details. Further, in one or more embodiment of the present invention, the receiving entities can reach back to an unknown contact number using a backtracking methodology.

As used herein the term "cognitive emotional intelligence" refers to the identification of the emotional connection between two users based on an interaction that occurred between them and the cognitive relationship created. For example, a cognitive analysis of an interaction between two users may conclude that the users had an argument and that any further communication between the two users is not recommended. In another example, a cognitive analysis may conclude that an interaction was incomplete and the chances of two users needing to interact in the near future are high.

As used herein, the term "electronic communication device" refers to any communication device or medium such as, but not limited to a mobile device such as a smartphone or laptop computer or wearable device, a landline telephone, and an Internet protocol telephone. Electronic communication devices include all user devices and electronic audio communication devices which support verbal communication between parties.

Turning now to FIG. 1, a system 100 that provides enhanced modes of communication is generally shown in accordance with one or more embodiments of the present invention. The system 100 shown in FIG. 1 includes a plurality of mobile devices 102 each including a contact service application 104 executing on the mobile devices 102 to perform at least a subset of the processing described herein. The mobile devices 102 may be implemented for example by a smartphone, a laptop computer, a wearable computer, and/or a tablet computer. The mobile devices 102 shown in FIG. 1 are in communication with each other via a short-range wireless communication method 106 such as, but not limited to: WiFi, Bluetooth, Zigbee, and infrared. In one or more embodiments of the present invention, the mobile devices 102 shown in FIG. 1 form an IoT network.

An example scenario where the system 100 of FIG. 1 can be utilized is one where the user of mobile device 102a is a presenter who is making a presentation to a group of people in an office conference room that includes a senior executive using mobile device 102b and a sales manager using mobile device 102c. In this example scenario, the senior executive may approach the presenter and congratulate him or her for a job well done and indicate that he has some ideas about new business opportunities that he would like to share with the presenter. However, when the two leave, the presenter may realize that he or she missed getting the contact details of the senior executive. Using embodiments of the present invention, the presenter can ask the contact service application 104 to connect him to the contact number of the senior executive whom he just spoke with. Using IoT and the processes described herein, the senior executive receives a notification on his mobile device that the presenter wishes to contact him. After the senior executive's consent, the two numbers may be linked and a phone call initiated.

In accordance with one or more embodiments of the present invention, the contact service application 104 executes in the background on the mobile devices 102 shown in FIG. 1 to emit signals containing contact information and to receive signals containing contact information. The contact information may be encrypted using any method known the art. In addition, the contact information may be stored on the mobile devices 102. In this manner, the contact service applications 104 executing on each of the mobile devices 102 are synching with each other. Other people having mobile devices may also be listening to the presentation, however unless they are executing the contact service application 104 they will not be able to exchange contact information with other mobile devices. As used herein, the term "contact information" refers to information that can be used to get in touch with a person such as, but not limited to a telephone number and/or an email address.

Figure 2:
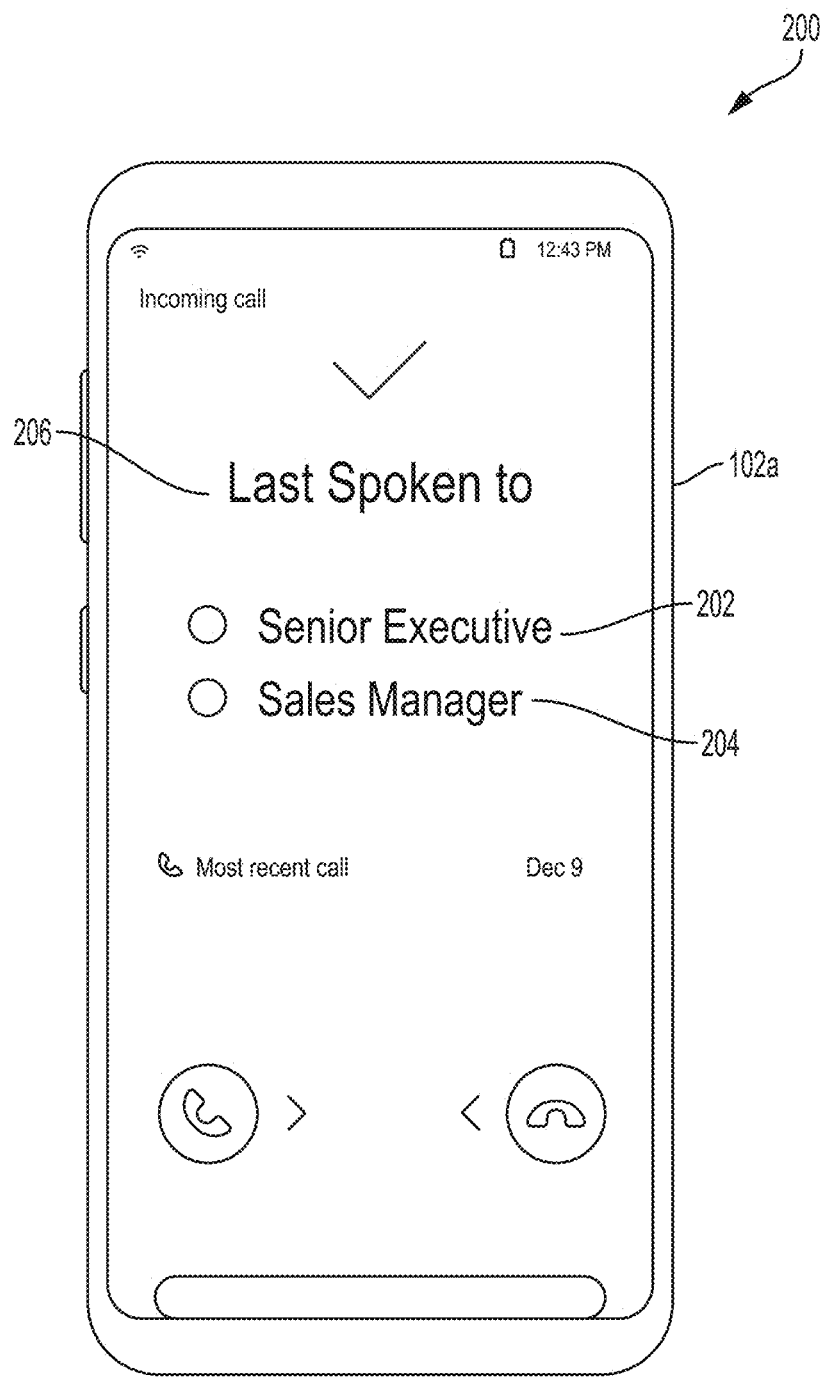
FIG. 2 depicts a user interface of a contact service application in accordance with one or more embodiments of the present invention.

After leaving the conference room and/or the office the presenter may remember that he or she has to check with the senior executive who was present in the conference room about a possible marketing lead. Using a user interface of the contact service application 104 executing on the presenter's mobile device 102a, the presenter can select a "last spoken to" option to find out contact information about the limited number of people who were present in the conference room during the presentation. This contact information was extracted by the contact service application 104 operating in a background mode while the mobile devices 102 were syncing during the presentation. An example of a user interface 200 in accordance with one or more embodiments of the present invention is shown in FIG. 2. The user interface 200 shown in FIG. 2 includes a last spoken to option 206 and a list of the titles of people who were present in the conference room. As shown in FIG. 2, the list includes senior executive 202 and sales manager 204. Other identifiers besides titles can be presented and utilized to identify other people. Examples include but are not limited to first name, department, and company name. The identifiers may be further grouped based on event (e.g., people present in the conference during the presentation).

In accordance with one or more embodiments of the present invention, the presenter selects the senior executive 202 on the user interface 200 to initiate a communication channel, or a contact, with the senior executive. A notification is sent to the mobile device 102b of the senior executive indicating that the presenter would like to contact him or her. The notification may be sent using any long or short range network method known in the art. If the senior executive consents to being contacted by the presenter, then the two telephone numbers are linked and a communication channel is established. The communication channel may include the mobile device 102a of the presenter calling the mobile device 102b of the senior executive or vice versa. The communication channel may also or may alternatively include the mobile device 102a sending an email to the mobile device 102b of the senior executive or vice versa. The communication channel may be via network such as the Internet for email and via a cellular network for telephone calls.

In accordance with one or more embodiments of the present invention, the communication channel is established without revealing the contact information to either party (e.g., the senior executive or the presenter). In accordance with one or more other embodiments of the present invention, one or both of the parties are provided with at least a subset of the contact information.

Figure 3:
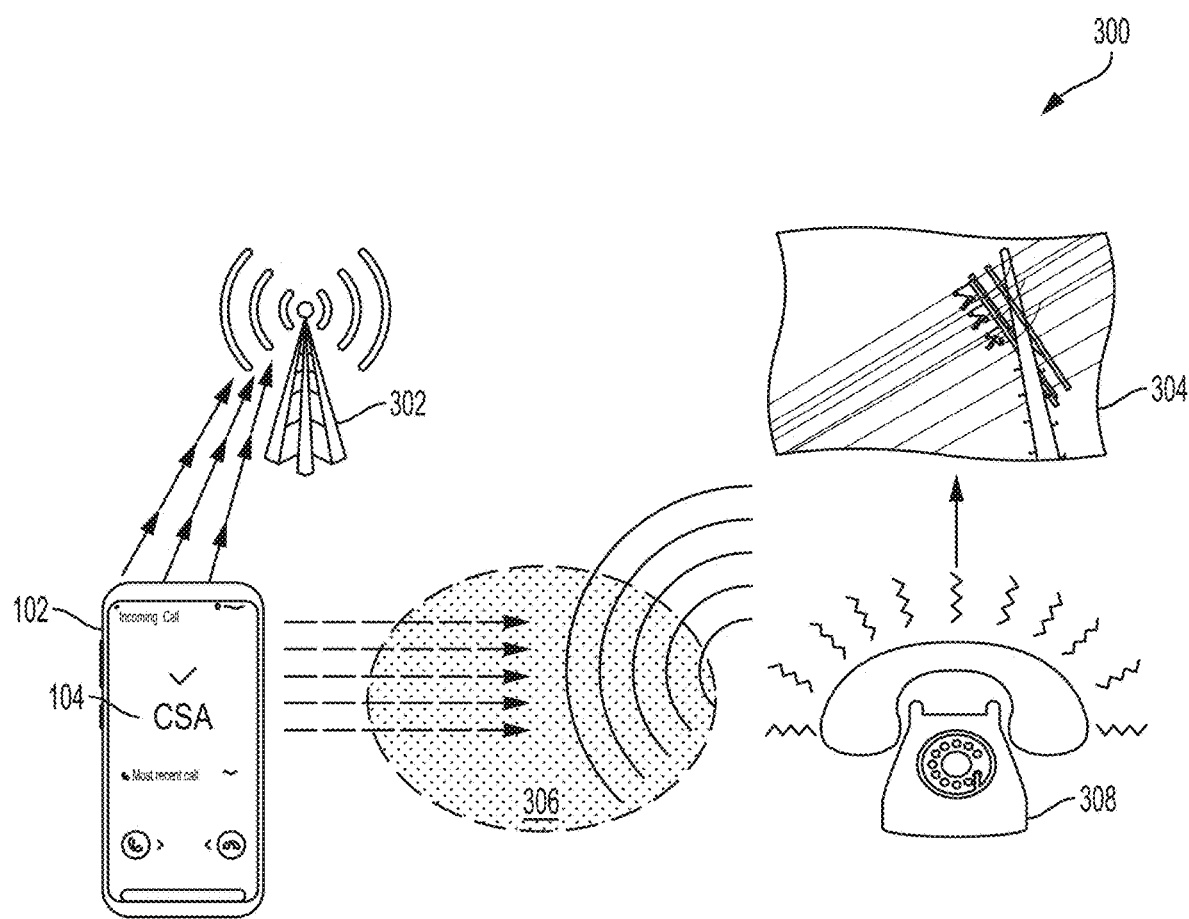
FIG. 3 depicts a system that provides enhanced modes of communication in accordance with one or more embodiments of the present invention.

Turning now to FIG. 3, a system 300 that provides enhanced modes of communication is generally shown in accordance with one or more embodiments of the present invention. The system 300 shown in FIG. 3 includes a mobile device 102 executing contact service application 104 and coupled to a cellular network 302, and a landline telephone 308 coupled to a landline telephone network 304. In addition, both the landline telephone 308 and the mobile device 102 emit signals using a short range communication medium to create an IoT 306.

An example scenario where the system 300 of FIG. 3 can be utilized is one where the user of the mobile device 102 is a human resource manager who is interviewing a job candidate using a landline telephone 308 in a meeting room. While the interview is in process, the landline telephone 308 and the mobile device 102 of the human resource manager are synchronizing with each other to share contact information using signals/radiation being emitted by the two devices. In an alternate embodiment, an IOT attachment to the landline telephone 308 provides a connection between the landline telephone 308 and the mobile device 102 to synchronize data. After the interview, the interviewer may want to ask the job candidate a few follow up questions. Instead of having to look up the contact information about the job candidate, the interviewer can select the last spoken to option on the contact service application 104 which will display the contact information (e.g., the telephone number) of the last person that he spoke to from the landline telephone 308. Using that option, the interviewer can contact the job candidate to obtain the additional information. In accordance with one or more embodiments, only the identifier information is displayed and the contact service application 104 initiates the communication channel (e.g., a phone call) to the job candidate.

Another example scenario where the system 300 of FIG. 3 can be utilized is one where the user of the mobile device 102 is a human resource manager who is conducting a round of telephonic interviews for a job candidate with interviewers from three different locations using the landline telephone 308 in a meeting room. The interviewers have all dialed in to a meeting bridge of the human resource manager. After the interview is over, the human resource manager closes the telephone call and leaves the meeting room. Now the human resource manager wants to talk to the interviewers to get their feedback on the job candidate. Contemporary methods of contacting the interviewers require the human resource manager to find and dial the telephone numbers of all of them separately. Using an embodiment of the present invention, the human resource manager can connect his mobile device 102 to the landline telephone 308 in the conference room. Through the meeting bridge, the contact service application 104 obtains the number of all of the people that human resource manager has spoken to lately. The names of all three interviewers shows up on the user interface of the contact service application 104 executing on the mobile device 102, and the human resource manager can select one or more of them to initiate a communication channel, such as a telephone call.

In accordance with one or more embodiments, the landline telephone 308 used by the human resources manager to dial into the bridge includes built-in storage to capture the contact details of the interviewers dialed into the meeting. The landline telephone 308 and the mobile device 102 of the human resource manager synchronize via the signals/radiation emitted by both of the devices and the contact details of the interviewers are made available in the mobile device 102 of the human resource manager as well. This allows a call to be initiated with any of the interviewers using the transferred contact details.

Figure 4:
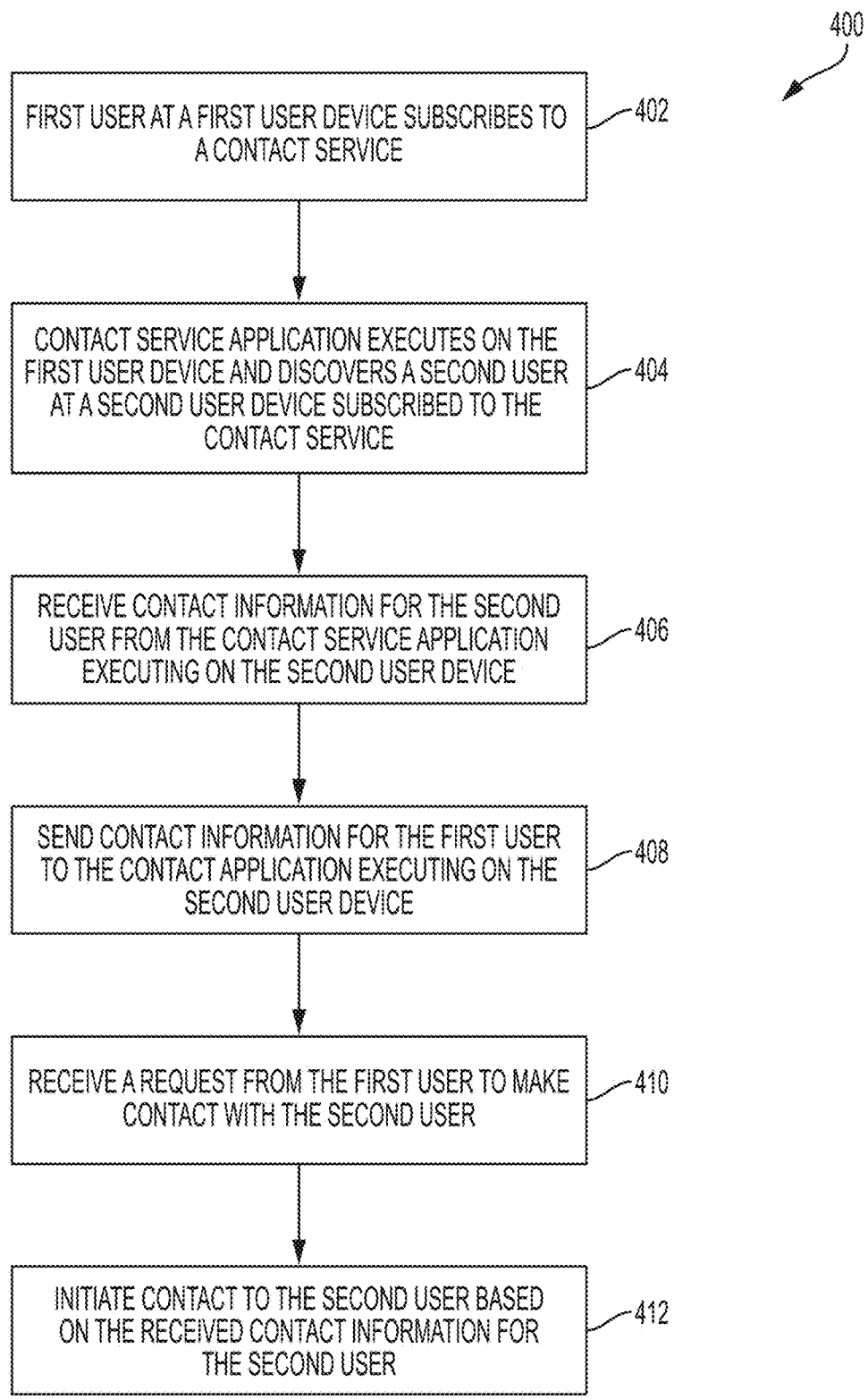
FIG. 4 is a flow diagram of a process for providing enhanced modes of communication in accordance with one or more embodiments of the present invention.

Turning now to FIG. 4, a flow diagram 400 of a process for providing enhanced modes of communication is generally shown in accordance with one or more embodiments of the present invention. All or a portion of the processing shown in FIG. 4 can be performed by a contact service application, such as contact service application 104 of FIGS. 1-3. The process starts at block 402 with a first user at a first user device, such as mobile device 102 of FIGS. 1-3, subscribing to the contact service application, such as contact service application 104 of FIGS. 1-3. As part of the subscribing, the first user may indicate what data (e.g., contact data and identifiers) he or she is willing to share and the contact service application shares data in accordance with the user preferences. At block 404, the contact service application executes in the background on the first user device to discover any other user devices in close proximity to the first user device that are also executing the contact service application. As used herein the term "executes in the background" refers to the contact service application running independently behind the scenes and without user intervention. The contact service application continuously transmits signals (e.g., Bluetooth signals) containing contact information and looks for signals from other contact service applications that are in close proximity and that contain contact information. Devices are in close proximity with each other when they can communicate with each other via short-range wireless technologies such as, but not limited to Bluetooth, ZigBee, and Wi-Fi. Devices may in close proximity, for example, when they are in the same conference room or in the same general area of a building. Communication via a short-range wireless technology is referred to herein as a "first communication channel."

As shown in block 404 of FIG. 2, a second user at a second user device subscribed to the contact service is discovered, or detected, by the first user device for example, by receiving a signal identified as a contact service application signal. In accordance with one or more embodiments of the present invention, the contact service application has its own private/public keys to identify if the signal received is from the application. When a signal is identified as to coming from the same contact service application, the device identifier is then used to pair the two devices together to form a first communication channel.

At blocks 406 and 408 of FIG. 4, contact information is exchanged between the contact service applications executing on the first and second devices via the first communication channel. In accordance with one or more embodiments of the present invention, the contact information comprises a telephone number or email address or other method of contacting the first or second user. In accordance with one or more embodiments of the present invention, a user determines what method they prefer for being contacted and enter their contact information via a user interface of the contact service application. The method of contact can vary between users. In accordance with one or more embodiments of the present invention, the contact information is encrypted so that it is not readable by either the first or second user. In this manner, a person's contact information may remain private. Along with contact information, the contact service applications may also exchange identifiers of the users such as, but not limited to: a first name of the user; a business title of the user; a company where the user works; and an interest of the user. An identifier is readable via the user interface and can be used when selecting a person to contact.

At block 410 of FIG. 4, the contact service application receives a request via the user interface (e.g., touchscreen, voice command) from the first user to make contact with the second user. The request can be received at some point in time after the contact information is exchanged such as after the first and second users are no longer in the same conference room or the same building or the next day. The second user can be selected by the first user based on an identifier of the second user in a list of user devices that were within a specified distance from the first user device. In an embodiment the list is displayed on the user interface of the first user device and the first user makes the selection via the user interface. The list of identifiers may include only a threshold number of those user devices that were most recently within the specified distance. Alternatively, or in addition, the list of identifiers may include only those users were within the specified distance within a specified time frame. In accordance with one or more embodiments of the present invention, several lists may be stored such as a list with identifiers of people who were within the specified distance on a particular day (or other time frame) or in a particular location (e.g., building, conference room, town). The first user can select a list via the user interface. In accordance with one or more embodiments of the present invention, the second user can also be selected by the contact service application based on the second user device being the most recent user device executing the contact service application that was within a specified distance from the first user device.

At block 412 of FIG. 4, the contact service application initiates a second communication channel with the second user. The second communication channel is different than the first communication channel and can be any method of contacting a person known in the art such as, but not limited to: a telephone call; a text; and an email. The actual contact information (e.g., telephone number) of the second user used by the communication channel may be kept secret (e.g., the phone number is not exposed to the first user) from the second user, thus preserving the second user's privacy. Portions of the contact information may be shared with the first user. For example, the second user may indicate that it is okay to share an email address but not a cellular telephone number.

Example embodiments provide a technological improvement over existing solutions that typically require a person to ask for contact information. A disadvantage to this contemporary approach is that the person may forget to ask for the contact information. Example embodiments provide a technical solution to this disadvantage by automatically collecting contact information from other user devices in an application running in the background and providing a communication channel between user devices based on the collected contact information.

Example embodiments provide a technological improvement over existing solutions that typically require a person to share their contact information with other people, even people that they expect or desire to have limited contact with. A disadvantage of this contemporary approach is the user having to share contact information which may lead to nuisance phone calls/emails. Example embodiments provide a technical solution to this disadvantage by allowing a person to make contact with another person for a limited amount of time and without requiring an exchange of contact information.

Figure 5:
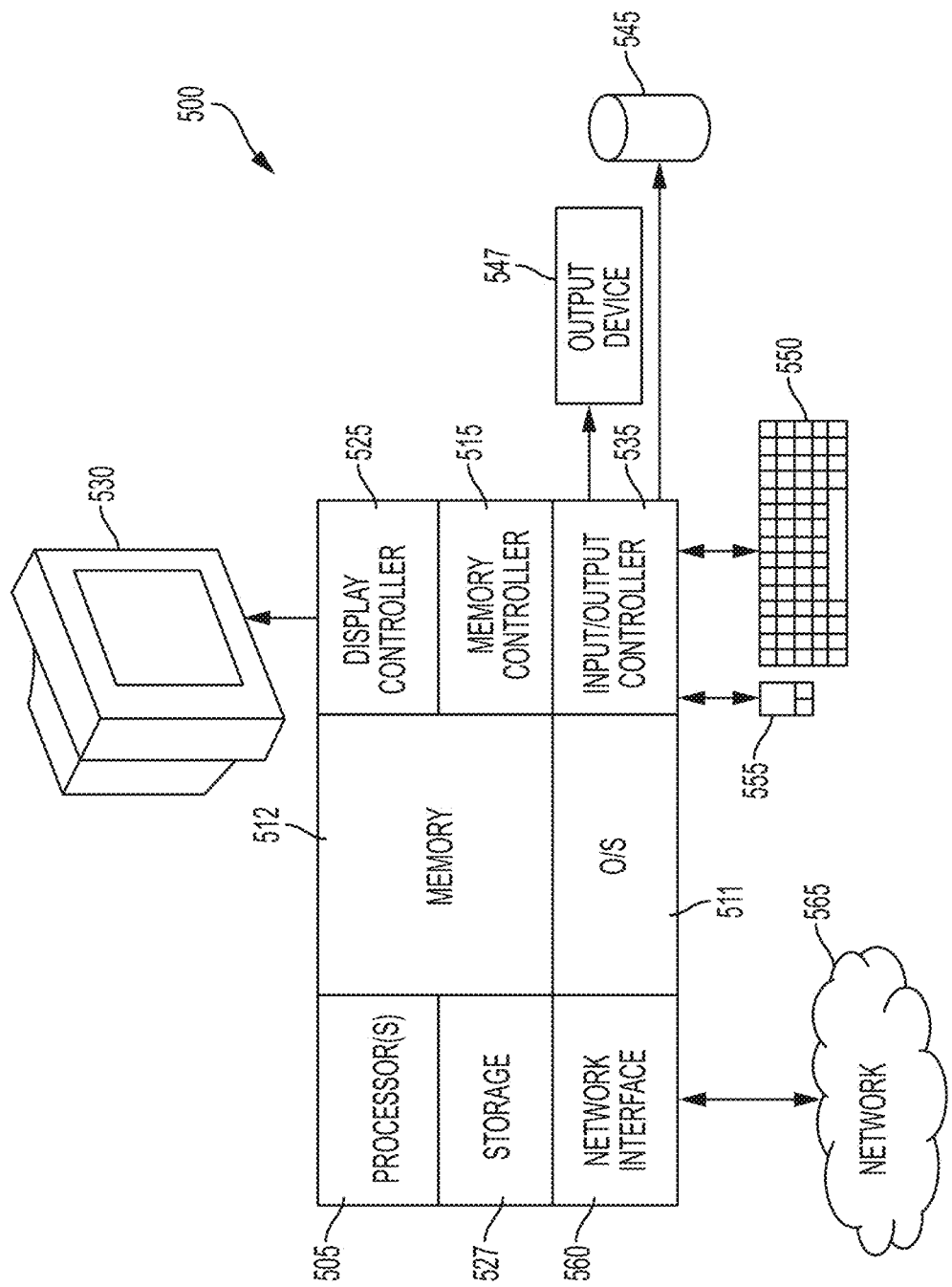
FIG. 5 is a block diagram of a computer system for implementing some or all aspects of providing enhanced modes of communication in accordance with one or more embodiments of the present invention.

Turning now to FIG. 5, a block diagram of a computer system for implementing some or all aspects of providing enhanced modes of communication is generally shown in accordance with one or more embodiments of the present invention. The processing described herein may be implemented in hardware, software (e.g., firmware), or a combination thereof. In an exemplary embodiment, the methods described may be implemented, at least in part, in hardware and may be part of the microprocessor of a special or general-purpose computer system, such as a mobile device, personal computer, workstation, minicomputer, or mainframe computer. In an embodiment the electronic devices 102 of FIGS. 1-3 are implemented by at least a subset of the computer system shown in FIG. 5.

In an exemplary embodiment, as shown in FIG. 5, the computer system includes a processor 505, memory 512 coupled to a memory controller 515, and one or more input devices 545 and/or output devices 547, such as peripherals, that are communicatively coupled via a local I/O controller 535. These devices 547 and 545 may include, for example, a printer, a scanner, a microphone, and the like. A conventional keyboard 550 and mouse 555 may be coupled to the I/O controller 535. The I/O controller 535 may be, for example, one or more buses or other wired or wireless connections, as are known in the art. The I/O controller 535 may have additional elements, which are omitted for simplicity, such as controllers, buffers (caches), drivers, repeaters, and receivers, to enable communications.

The I/O devices 547, 545 may further include devices that communicate both inputs and outputs, for instance disk and tape storage, a network interface card (NIC) or modulator/demodulator (for accessing other files, devices, systems, or a network), a radio frequency (RF) or other transceiver, a telephonic interface, a bridge, a router, and the like.

The processor 505 is a hardware device for executing hardware instructions or software, particularly those stored in memory 512. The processor 505 may be a custom made or commercially available processor, a central processing unit (CPU), an auxiliary processor among several processors associated with the computer system, a semiconductor based microprocessor (in the form of a microchip or chip set), a microprocessor, or other device for executing instructions. The processor 505 can include a cache such as, but not limited to, an instruction cache to speed up executable instruction fetch, a data cache to speed up data fetch and store, and a translation look-aside buffer (TLB) used to speed up virtual-to-physical address translation for both executable instructions and data. The cache may be organized as a hierarchy of more cache levels (L1, L2, etc.).

The memory 512 may include one or combinations of volatile memory elements (e.g., random access memory, RAM, such as DRAM, SRAM, SDRAM, etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 512 may incorporate electronic, magnetic, optical, or other types of storage media. Note that the memory 512 may have a distributed architecture, where various components are situated remote from one another but may be accessed by the processor 505.

The instructions in memory 512 may include one or more separate programs, each of which comprises an ordered listing of executable instructions for implementing logical functions. In the example of FIG. 5, the instructions in the memory 512 include a suitable operating system (OS) 511. The operating system 511 essentially may control the execution of other computer programs and provides scheduling, input-output control, file and data management, memory management, and communication control and related services.

Additional data, including, for example, instructions for the processor 505 or other retrievable information, may be stored in storage 527, which may be a storage device such as a hard disk drive or solid state drive. The stored instructions in memory 512 or in storage 527 may include those enabling the processor to execute one or more aspects of the dispatch systems and methods of this disclosure.

The computer system may further include a display controller 525 coupled to a display 530. In an exemplary embodiment, the computer system may further include a network interface 560 for coupling to a network 565. The network 565 may be an IP-based network for communication between the computer system and an external server, client and the like via a broadband connection. The network 565 transmits and receives data between the computer system and external systems. In an exemplary embodiment, the network 565 may be a managed IP network administered by a service provider. The network 565 may be implemented in a wireless fashion, e.g., using wireless protocols and technologies, such as WiFi, WiMax, etc. The network 565 may also be a packet-switched network such as a local area network, wide area network, metropolitan area network, the Internet, or other similar type of network environment. The network 565 may be a fixed wireless network, a wireless local area network (LAN), a wireless wide area network (WAN) a personal area network (PAN), a virtual private network (VPN), intranet or other suitable network system and may include equipment for receiving and transmitting signals.

Systems and methods for enhanced communication methods can be embodied, in whole or in part, in computer program products or in computer systems, such as that illustrated in FIG. 5.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
    collecting information, the collecting performed in a background mode without user intervention by a contact service application executing on a first electronic communication device of a first user, the collecting comprising:
        detecting, via a first communication channel, one or more second electronic communication devices of second users in close proximity to the first electronic communication device and executing copies of the contact service application;
        receiving, via the first communication channel, contact information for each of the second users; and
        encrypting at least a portion of the contact information for each of the second users in a format not readable via a user interface of the first electronic communication device;
    receiving, subsequent to the collecting and via the user interface of the first electronic communication device, a request from the first user to contact a selected one of the second users, the first electronic communication device no longer in close proximity to a second electronic communication device of the selected one of the second users; and
    in response to receiving the request, initiating, by the contact service application executing on the first electronic communication device, a second communication channel with the selected one of the second users based at least in part on the received contact information, the second communication channel different than the first communication channel,
    wherein the collecting information further comprises receiving an identifier of the selected one of the second users that is shared in accordance with a user preference of the selected one of the second users, the identifier readable via the user interface of the first electronic communication device, and the user selects the one of the second users based on the identifier.

2. The method of claim 1, wherein the identifier includes a first name of the one of the second users.

3. The method of claim 1, wherein the identifier includes a business title of the one of the second users.

4. The method of claim 1, wherein the request from the first user to contact a selected one of the second users comprises a request to contact a last person spoken to by the first user and the contact service application selects the one of the second users.

5. The method of claim 1, wherein the received contact information for each of the second users is available for initiating a second communication channel for a threshold period of time after the contact information is received.

6. The method of claim 1, wherein less than a threshold number of most recently received contact information is available for initiating a second communication channel.

7. A system comprising:
    a memory having computer readable instructions; and
    one or more processors for executing the computer readable instructions, the computer readable instructions controlling the one or more processors to perform operations comprising:

collecting information, the collecting performed in a background mode without user intervention by a contact service application executing on a first electronic communication device of a first user, the collecting comprising:
  detecting, via a first communication channel, one or more second electronic communication devices of second users in close proximity to the first user and executing copies of the contact service application;
  receiving, via the first communication channel, contact information for each of the second users; and
  encrypting at least a portion of the contact information for each of the second users in a format not readable via a user interface of the first electronic communication device;
receiving, subsequent to the collecting and via the user interface of the first electronic communication device, a request from the first user to contact a selected one of the second users, the first electronic communication device no longer in close proximity to a second electronic communication device of the selected one of the second users; and
in response to receiving the request, initiating, by the contact service application executing on the first electronic communication device, a second communication channel with the selected one of the second users based at least in part on the received contact information, the second communication channel different than the first communication channel,
wherein the collecting information further comprises receiving an identifier of the selected one of the second users that is shared in accordance with a user preference of the selected one of the second users, the identifier readable via the user interface of the first electronic communication device, and the user selects the one of the second users based on the identifier.

8. The system of claim 7, wherein the identifier includes a first name of the one of the second users.

9. The system of claim 7, wherein the identifier includes a business title of the one of the second users.

10. The system of claim 7, wherein the request from the first user to contact a selected one of the second users comprises a request to contact a last person spoken to by the first user and the contact service application selects the one of the second users.

11. The system of claim 7, wherein the received contact information for each of the second users is available for initiating a communication channel for a threshold period of time after the contact information is received.

12. The system of claim 7, wherein less than a threshold number of most recently received contact information is available for initiating a communication channel.

13. A computer program product comprising a non-transitory computer readable storage medium having program instructions embodied therewith, the program instructions executable by a processor to cause the processor to perform operations comprising:
  collecting information, the collecting performed in a background mode without user intervention by a contact service application executing on a first electronic communication device of a first user, the collecting comprising:
    detecting, via a first communication channel, one or more second electronic communication devices of second users in close proximity to the first electronic communication device and executing copies of the contact service application;
    receiving, via the first communication channel, contact information for each of the second users;
    encrypting at least a portion of the contact information for each of the second users in a format not readable via a user interface of the first electronic communication device;
  receiving, subsequent to the collecting and via the user interface of the first electronic communication device, a request from the first user to contact a selected one of the second users, the first electronic communication device no longer in close proximity to a second electronic communication device of the selected one of the second users; and
  in response to receiving the request, initiating, by the contact service application executing on the first electronic communication device, a second communication channel with the selected one of the second users based at least in part on the received contact information, the second communication channel different than the first communication channel,
  wherein the collecting information further comprises receiving an identifier of the selected one of the second users that is shared in accordance with a user preference of the selected one of the second users, the identifier readable via the user interface of the first electronic communication device, and the user selects the one of the second users based on the identifier.

14. The computer program of claim 13, wherein the request from the first user to contact a selected one of the second users comprises a request to contact a last person spoken to by the first user and the contact service application selects the one of the second users.

15. The computer program product of claim 13, wherein the received contact information for each of the second users is available for initiating a second communication channel for a threshold period of time after the contact information is received.

* * * * *